(12) United States Patent
Shelcoviz et al.

(10) Patent No.: US 9,383,031 B2
(45) Date of Patent: Jul. 5, 2016

(54) CHECK VALVE APPARATUS AND METHODS

(71) Applicant: Curtiss-Wright Flow Control Corporation, Falls Church, VA (US)

(72) Inventors: Abraham Shelcoviz, Irvine, CA (US); Haykaz Mkrtchyan, Northridge, CA (US)

(73) Assignee: CURTISS-WRIGHT FLOW CONTROL CORPORATION, Falls Church, VA (US)

( * ) Notice: Subject to any disclaimer, the term of this patent is extended or adjusted under 35 U.S.C. 154(b) by 144 days.

(21) Appl. No.: 14/312,843

(22) Filed: Jun. 24, 2014

(65) Prior Publication Data

US 2015/0000748 A1 Jan. 1, 2015

Related U.S. Application Data (60) Provisional application No. 61/840,413, filed on Jun. 27, 2013.

(51) Int. Cl.
*E03B 7/07* (2006.01)
*F16K 37/00* (2006.01)
*F16K 15/06* (2006.01)

(52) U.S. Cl.
CPC ............ *F16K 37/0075* (2013.01); *F16K 15/063* (2013.01); *Y10T 137/0318* (2015.04); *Y10T 137/7837* (2015.04); *Y10T 137/7869* (2015.04)

(58) Field of Classification Search
CPC ....... F16K 1/126; F16K 15/063; F16K 15/18; Y10T 137/7785; Y10T 137/7869; Y10T 137/0318; Y10T 137/8359
USPC ........................... 137/559, 517; 251/227, 229
See application file for complete search history.

(56) References Cited

U.S. PATENT DOCUMENTS

| | | | |
|---|---|---|---|
| 2,699,799 A | 1/1955 | Wager | |
| 2,850,039 A | 9/1958 | Johnson | |
| 3,032,063 A * | 5/1962 | Wells | F16K 15/18 |
| | | | 137/512.1 |
| 3,114,391 A | 12/1963 | Kurtz | |
| 3,794,077 A | 2/1974 | Fanshier | |
| 4,105,044 A | 8/1978 | Davitt | |
| 4,638,832 A | 1/1987 | Mokveld | |
| 4,699,166 A | 10/1987 | Gold et al. | |
| 4,747,426 A | 5/1988 | Weevers | |
| 4,766,929 A | 8/1988 | Yaindl | |
| 5,226,445 A | 7/1993 | Surjaatmadja | |
| 5,921,276 A | 7/1999 | Lam et al. | |
| 6,742,539 B2 | 6/2004 | Lyons | |
| 8,701,693 B2 | 4/2014 | Shelcoviz et al. | |
| 2009/0250123 A1 | 10/2009 | Matsubara et al. | |
| 2010/0101668 A1 | 4/2010 | Roorda | |

OTHER PUBLICATIONS

Ballun, John V.; "A Methodology for Predicting Check Valve Slam"; Journal AWWA 99:3; Mar. 2007; pp. 60-65.

* cited by examiner

*Primary Examiner* — Craig Schneider
*Assistant Examiner* — P. Macade Nichols
(74) *Attorney, Agent, or Firm* — Pearne & Gordon LLP (57) ABSTRACT

A check valve apparatus includes at least one first test channel including a first pathway extending through a valve body and in communication with a flow path. The pathway is configured to receive a test stick for inserting through the pathway of the test channel to engage a disc such that the disc moves from the open position to the closed position. In further examples, methods for testing a check valve include the step of moving an end of a test stick to engage a downstream face of a disc such that the disc is moved against a bias of a biasing device from the open position to the closed position. The method further includes the step of inspecting an interior portion of the check valve apparatus.

32 Claims, 9 Drawing Sheets

CHECK VALVE APPARATUS AND METHODS

CROSS-REFERENCE TO RELATED APPLICATIONS

This application claims the benefit of U.S. Provisional Application No. 61/840,413, filed Jun. 27, 2013, the entire disclosure of which is hereby incorporated herein by reference.

FIELD OF THE INVENTION

The technology described herein relates to a check valve apparatus.

BACKGROUND OF THE INVENTION

Passive check valves are known. There are numerous types of passive check valves, including flap-type valves, ball valves, and disc valves. Known disc check valves are typically biased closed via a spring or other mechanism. Liquid that flows against the disc during normal operation opens the valve, allowing liquid to flow through the valve in a forward direction. If the liquid reverses flow so that there is no longer any flow in the forward direction, the disc slams closed because the spring biases the disc into a closed position. This prevents the valve from flowing in an unintended direction.

Passive check valves are commonly used in piping systems to prevent backflow from damaging systems that are upstream of the valve. For example, check valves can be used in a piping system that includes a pump that is positioned upstream of the check valve. Should flow reverse, it is important that the reversing flow not be permitted to engage the pump. Reverse flow into the turbine of a pump could cause serious damage to the pump.

Passive check valves are also utilized in nuclear power plants. In nuclear power plants, a flow path is coupled to the nuclear-reactor that will allow cooling water to enter a containment center in the event of an accident. Flow is permitted from the cooling reservoir into the containment center in order to cool the reactor. However, reverse flow is highly undesirable since it will potentially allow hot, radioactive material to flow outside the containment center. Passive check valves are utilized in systems such as this in order to prevent the reverse flow of fluid through the check valve. The USA Nuclear Regulatory Commission requires maintaining plant safety. Those requirements include, among other things, plant operating procedures that require that check valves and other safety-related equipment be tested periodically to verify proper operation. This results in increased safety and reliability in the design of nuclear power plants.

Check valves in nuclear plant systems may often sit idle for years. It is important that they be tested to confirm that they will work in the event of an accident.

BRIEF SUMMARY OF THE INVENTION

In accordance with the teachings described herein, an example check valve is shown and described. A method for testing a check valve is also described.

In accordance with a first aspect, a check valve apparatus comprises a valve body defining a flow path, a valve member positioned within the flow path of the valve body, and a movable disc coupled to the valve member and movable with respect to the valve member within the flow path between an open position wherein the flow path is open and a closed position wherein the flow path is closed. The check valve apparatus further includes at least one first test channel including a first pathway extending through the valve body and in communication with the flow path, wherein the pathway is configured to receive a test stick for inserting through the pathway of the test channel to engage the disc such that the disc moves from the open position to the closed position.

In one example of the first aspect, the movable disc includes a downstream face and an upstream face provided with an upstream valve seat, wherein the check valve apparatus is configured such that the test stick may be inserted through the pathway to engage the downstream face of the disc such that the disc moves from the open position to the closed position. For example, the movable disc can include at least one rotation element defined by the downstream face of the movable disc, wherein the rotation element is configured to be engaged by the test stick to rotate the disc while moving the disc from the open position to the closed position. In another example, the rotation element comprises a groove that may be optionally straight. In another example, the at least one rotation element comprises a plurality of rotation elements radially spaced about a central axis of the movable disc. In still another example, the rotation element is configured to interact with the test stick to rotate the disc while linearly translating the test stick through the first pathway along a linear axis.

In another example of the first aspect, the first test channel includes a second pathway extending through the valve member, wherein the second pathway extends along the linear axis such that the first pathway is axially aligned with the second pathway to simultaneously receive a linear segment of a substantially rigid test stick.

In still another example of the first aspect, the valve apparatus is configured to receive the test stick for inserting through the pathway of the test channel to engage the disc such that the disc rotates while moving from the open position to the closed position. For example, the pathway may be configured to receive a substantially rigid test stick while permitting linear translation of the test stick through the pathway to rotate the disc while moving the disc from the open position to the closed position.

In yet another example of the first aspect, the movable disc includes a downstream face and an upstream face provided with an upstream valve seat, and the check valve apparatus further includes at least one second test channel and configured such that a test stick may be inserted through the pathway of the second test channel to engage the upstream face of the disc to determine a location of the disc.

In still another example of the first aspect, the apparatus further comprises a compression spring configured to bias the movable disc into the open position and wherein the movable disc is configured to move to the closed position against the bias of the compression spring in response to a reverse flow through the flow path. For example, the apparatus can include at least one second test channel in fluid communication with an external port outside of the flow path, wherein the movable disc is configured to move to the closed position against the bias of the compression spring in response to a fluid flowing through the second test channel from the external port. In another example, the valve body includes a cylindrical feed channel in fluid communication with the external port and the second test channel. In still another example, the at least one second test channel comprises a plurality of second test passages, with each second test channel passage being defined in a corresponding one of a plurality of coupling ribs.

In another example of the first aspect, the valve member can comprise a diffuser with a conical flow diverter. In one example, the conical flow diverter includes an upstream face and the compression spring biases a downstream face of the movable disc against the upstream face of the conical flow diverter in the open position. In another example, the diffuser includes at least one axial bore configured to receive a reverse flow through the flow path to act against the downstream face of the movable disc to bias the disc toward the closed position against the bias of the compression spring.

The first example aspect may be carried out alone or in combination with one or any number of the examples of the first aspect discussed above.

In accordance with a second aspect, a method for testing a check valve apparatus includes a movable disc positioned within a flow path of the check valve apparatus, wherein the movable disc is biased into the open position with a biasing device, and wherein the disc is configured to be moved to a closed position against the bias of the biasing device to close the flow path of the check valve apparatus, the check valve apparatus including at least one first test channel. The method comprises the step of moving an end of a test stick to engage a downstream face of the disc such that the disc is moved against the bias of the biasing device from the open position toward the closed position. The method further includes the step of inspecting an interior portion of the check valve apparatus after the step of moving.

In one example of the second aspect, the step of moving rotates the disc while the disc is moved from the open position toward the closed position. For example, the end of the test stick can engage a rotation element of the downstream face of the disc to rotate the disc.

In another example of the second aspect, the step of moving provides a first incremental rotation of the disc by a first rotation angle of less than 360°. Still further, the method can include the step of inspecting inspects a radial segment of the movable disc associated with the first rotation angle. In further examples, method includes another step of moving that provides a second incremental rotation of the disc by a second rotation angle of less than 360° and the step of inspecting includes a further step of inspecting another radial segment of the movable disc associated with the second rotation angle.

In another example of the second aspect, the step of confirming the location of the disc within the flow path by engaging an upstream face of the disc with an end of the test stick.

In another example of the second aspect, the step of inspecting includes viewing the interior portion of the check valve apparatus with an optical viewing device.

In another example of the second aspect, the step of inspecting includes inspecting a peripheral portion of the disc.

In another example of the second aspect, the step of inspecting includes inspecting the biasing device.

In another example of the second aspect, the step of moving biases the disc from the open position to the closed position.

In another example of the second aspect, the step of moving biases of the disc from the open position to an intermediate position between the open position and the closed position, wherein the step of inspecting is conducted when the disc is in the intermediate position.

The second example aspect may be carried out alone or in combination with one or any number of the examples of the second aspect discussed above.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

The technology described herein relates generally to a passive check valve. Check valves of this sort may be used in piping systems, such as those in commercial nuclear power plants, where shut off of the valve is critical in back flow situations in order to avoid catastrophic failure. It is desirable to have passive check valves in the event of power or other failures, such that the check valve will close regardless of external factors and does not require access to electricity or manual operator input in order to close.

Space limitations often require compact designs for check valves. In addition, valve operation performance must be verifiable via testing, which typically occurs during plant outages, with no ability to have actual operational flow conditions.

Referring to the figures, the example valve 10 includes a valve body 12, a diffuser 14, a diffuser retaining ring 16, a disc 18, a spring 20, spring holder 60, and a spring holder retaining ring 22. The valve body 12 is a cylindrical member that holds internal parts of the check valve 10 and that may be coupled at either end to a pipeline 24. The valve body 12 may have the same diameter D1 as the pipeline diameter D2, a greater diameter than the pipeline, or a smaller diameter than the pipeline. The valve body 12 includes an interior surface 26 that is shaped to fit the diffuser 14 and includes an inlet 28 and an outlet 30. The interior surface 26 includes a flow guiding surface, a flow diverging surface, a disc seating surface or valve seat 32, and a flow converging surface (from front to rear of the flow channel). The valve seat 32 is spaced downstream from the inlet 28. A flow path 34 is formed inside the valve body 12 around the diffuser 14. This flow path is shaped to create minimal pressure loss to the flowing fluid.

Figure 1:
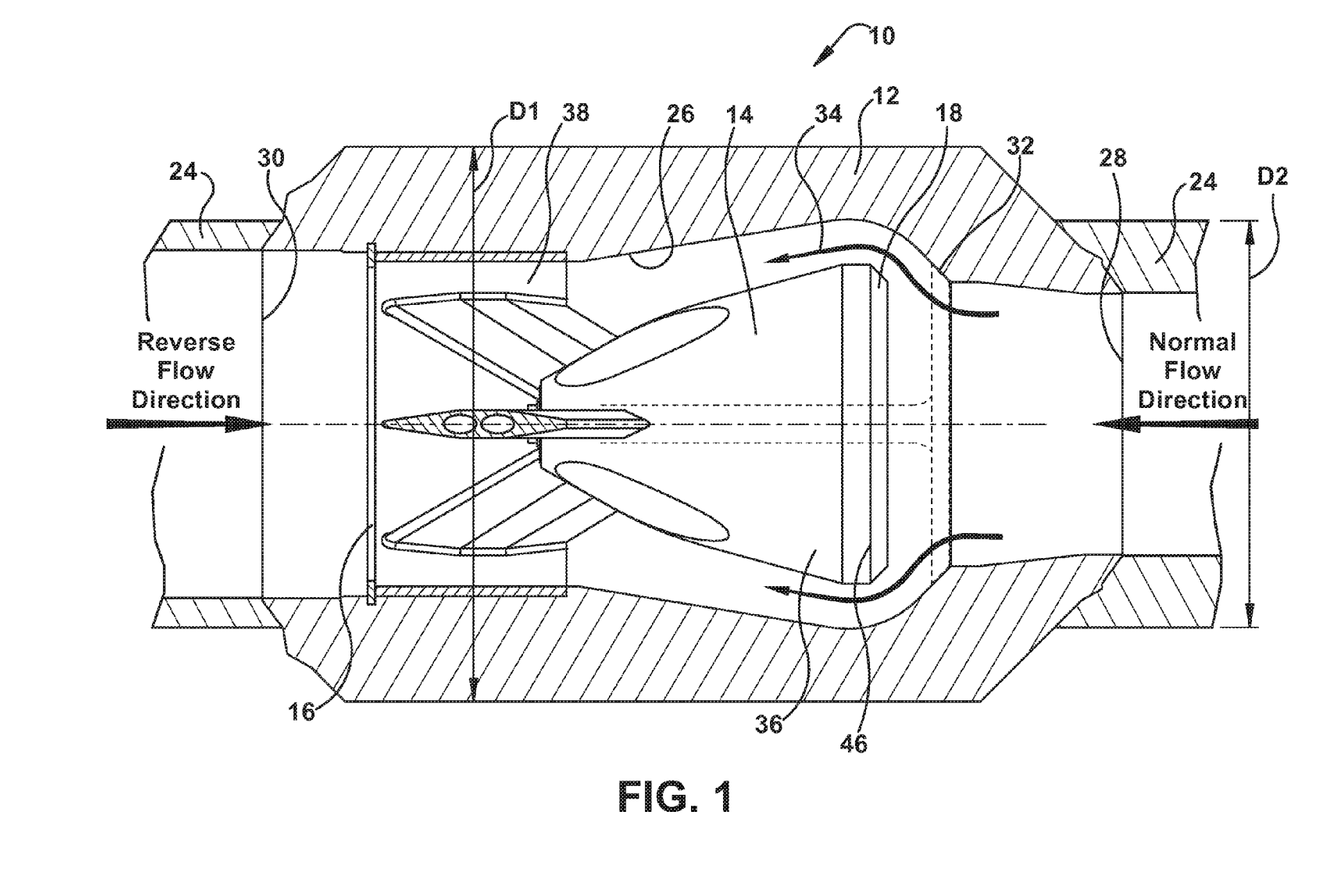
FIG. 1 is a cut-away view of the interior of a piping system that incorporates an example check valve.
Figure 2:
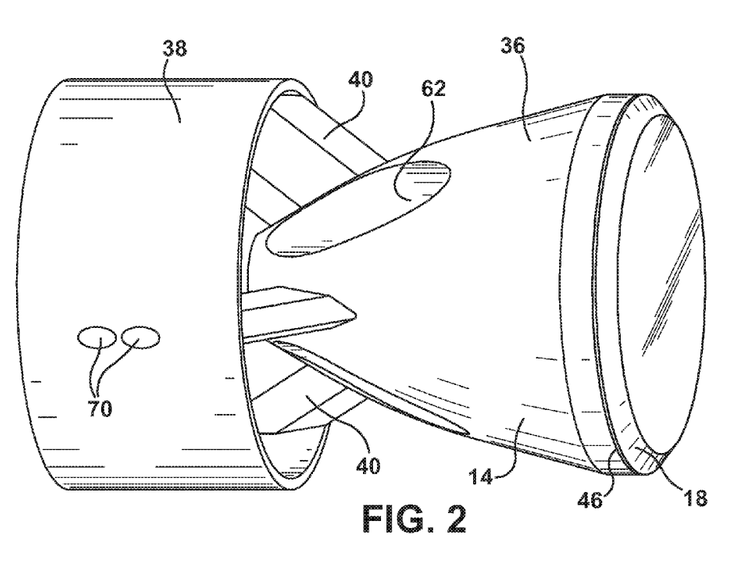
FIG. 2 shows a perspective view of a diffuser for use with the example check valve of FIG. 1, showing the disc position when the valve is in an open position.
Figure 3:
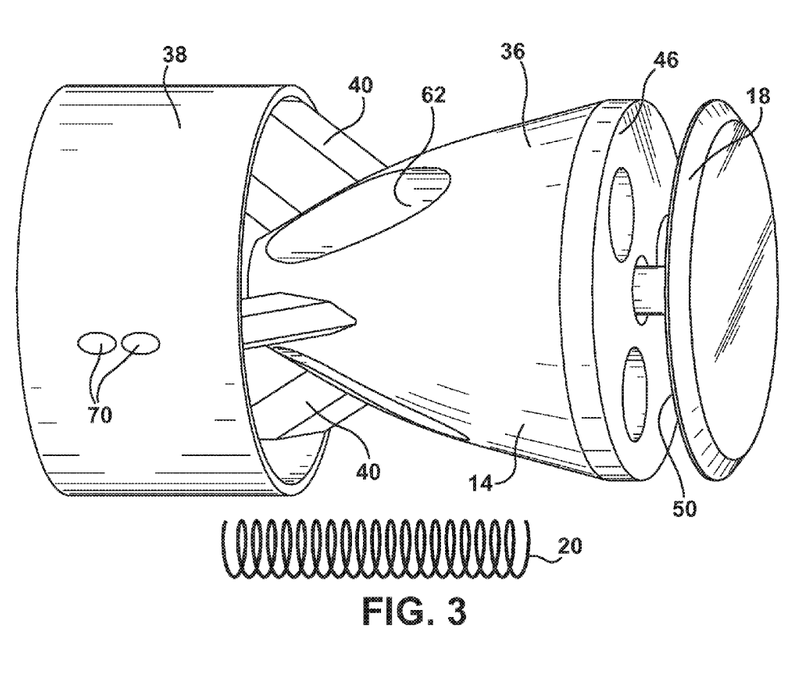
FIG. 3 shows the diffuser of FIG. 2 where the valve is in a closed position, and a spring that is in a lesser compressed position than normally compressed inside a cavity within the diffuser.

FIGS. 2 and 3 show perspective views of the diffuser. The diffuser 14 is positioned inside the valve body 12 downstream of the valve seat 32. The diffuser 14, which is shown more clearly in FIGS. 2 and 3, has a cone-shaped flow diverter 36 at one end and a cylindrical bearing ring 38 at the other end. The conical diverter 36 is positioned upstream from the cylindrical bearing ring 38. The cylindrical bearing ring 38 is positioned upstream of the valve outlet 30. The cylindrical bearing ring 38 includes ribs or supports 40 that couple the conical diverter 36 to the cylindrical bearing ring 38. The example shown includes three such rib supports 40.

The valve body 12 includes a cylindrical ledge 42 that the upstream end of the cylindrical bearing ring 38 of the diffuser 14 seats against. Then a diffuser circular retaining ring 16 is positioned inside the valve body 12 at the downstream end of the cylindrical bearing ring 38 and holds the diffuser 14 inside the valve body 12 against the ledge 42. As is evident from FIG. 4, the flow path 34 is created around the front edge 46 of the diffuser 14. The flow path 34 then leads through the cylindrical bearing ring 38 so that flow can exit the valve body 12 at the outlet 30.

Figure 4:
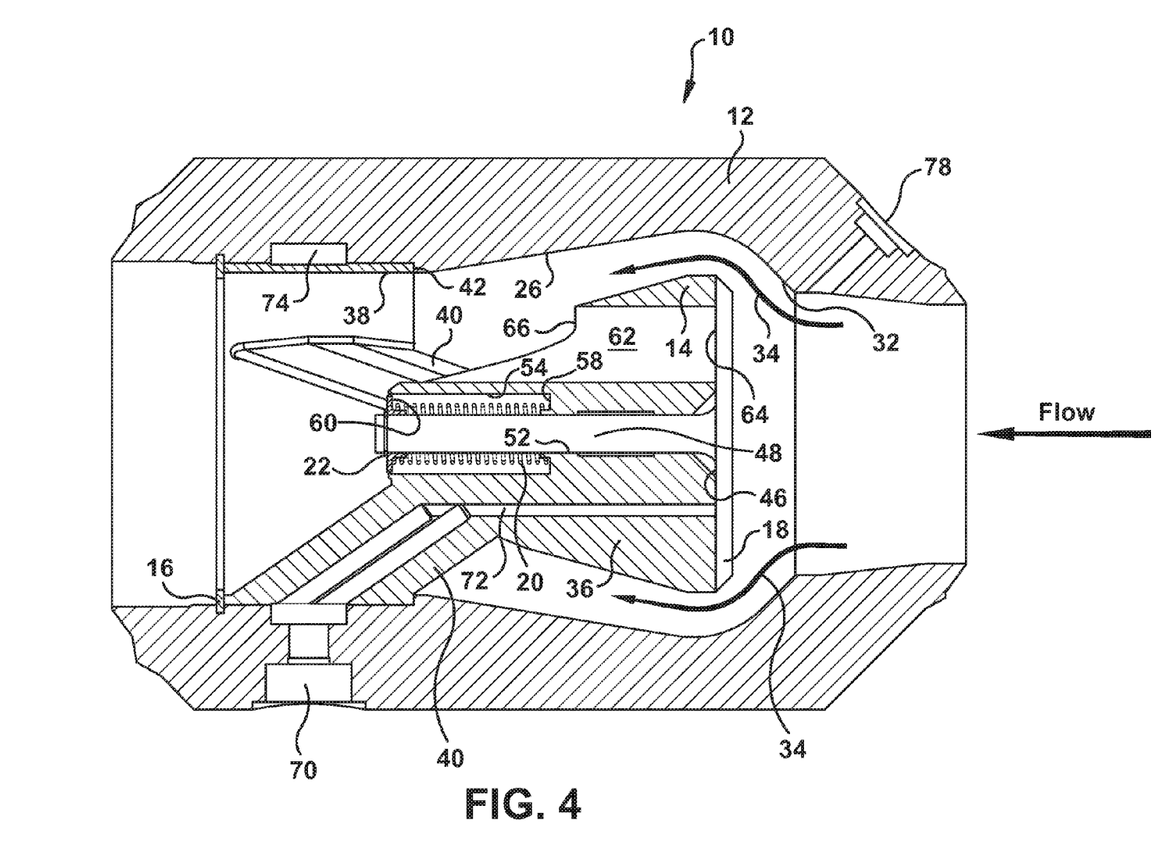
FIG. 4 is a cross-sectional view of the example check valve with the diffuser installed therein in a no-flow or forward flow position.
Figure 5:
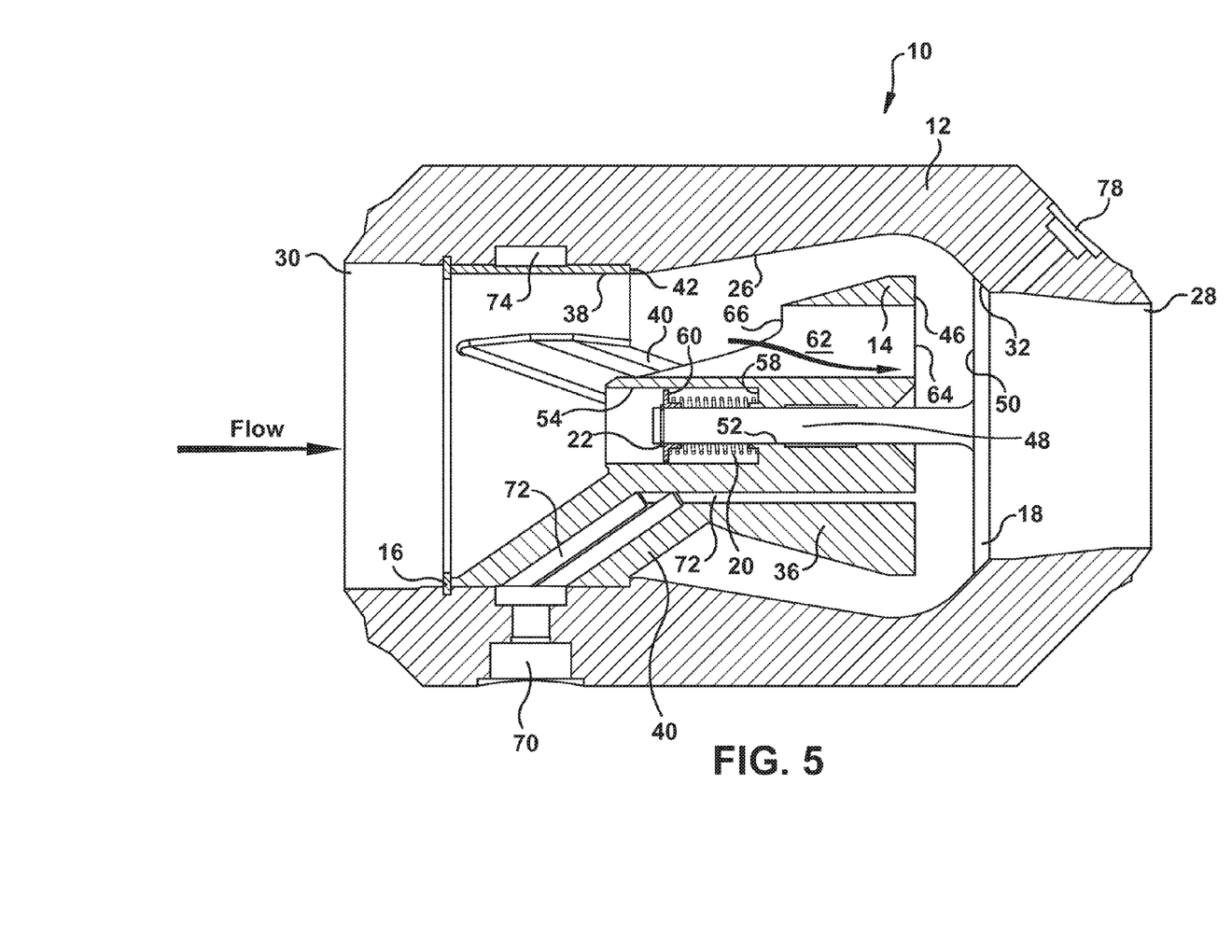
FIG. 5 is a cross-sectional view of the example check valve with flow in a reverse direction.

Referring to FIGS. 4 and 5, the valve body 12 and the diffuser 14 are stationary and do not change position in any mode of operation. The disc 18 and spring 20 are the active components of the valve. The disc 18 is coupled to a shaft or stem 48 at the rear, downstream face 50 of the disc 18. The disc 18 and stem 48 may be fabricated as one piece, as shown in the drawings, or may be formed separately. The stem 48 extends axially in a passageway 52 defined in the center of the diffuser 14. The stem 48 is movable axially within the passageway 52 such that the disc 18 is movable toward and away from the upstream, forward face 46 of the diffuser 14.

The diffuser 14 includes an inner axially extending cavity 54 for housing a compressed spring 20. A spring holder retaining ring 22 holds the spring holder 60 to the end of the stem 48 in the cavity 54. The spring holder 60 also serves as a base for the spring 20. An abutment 58 is also formed at the forward, upstream end of the cavity 54 and the other end of the spring 20 seats around the abutment 58 to hold the spring 20 in place within the cavity. The spring 20 biases the stem 48 in a downstream direction, so that the disc 18 is normally seated against the face 46 of the diffuser 14. Thus, the valve 10 is normally in an open position, which means that the disc 18 is positioned against the face 46 of the diffuser 14 and is not seated against the upstream valve seat 32.

The spring 20, shown in an uncompressed state in FIG. 3, is a compression spring, which means that the spring 20 becomes shorter when under load. The spring 20 is coiled and its turns (loops) are not touching when the valve is in open or closed position. As mentioned above, the upstream end of the spring 20 is positioned around an abutment 58 that is positioned at the upstream end of the cavity. In addition, the downstream end of the spring 20 seats around the spring holder 60 that is held in place by the spring holder retaining ring 22.

The diffuser 14 includes functional reverse flow paths or passageways 62 that are through bores that extend axially through a rear side of the conical diverter 36 to the leading edge 46 of the diffuser 14. Three reverse flow passageways 62 may be provided 120 degrees from one another. Alternatively, more or less reverse flow passageways 62 may be provided. The reverse flow passageways 62 extend through the conical diverter 36 and each of the passageways 62 has a leading edge end 64 and a downstream, rear end 66. The leading edge end 64 of the diffuser 14 abuts the downstream side 50 of the disc 18 when the valve 10 is in an open position.

As an alternative to the reverse flow through bores 62, or in addition to it, the disc 18 may have an outer diameter that is greater than an outer diameter of the diffuser 14 (not shown). When reverse flow occurs through the valve 10, the flow will initially impact the part of the disc 18 that has a larger diameter than the diffuser and force the disc to close against the valve seat 32.

In operation, when reverse flow occurs through the pipe line 24, liquid will flow through the reverse flow passageways 62 of the diffuser 14 and also around the outer sides of the leading edge 46 of the diffuser 14. When the reverse flow impacts the downstream face 50 of the disc 18, the force created by the flow on the disc 18 pushes the disc 18 upstream until it mates with the valve seat 32 defined on the valve body 12. Thus, the diffuser 14 remains stationary and the only parts that move during valve closure are the disc/stem 18/48 and the spring 20. The disc 18 and stem 48 may be integrally formed together or could be welded or otherwise connected together.

The disc 18 is movable into a closed position in response to fluid flow against the downstream side 50 of the disc 18. Reverse fluid flow-induced force against the downstream side 50 of the disc 18 forces the disc 18 to move into a closed position. As the reverse fluid flow decreases below a predetermined closure velocity, the disc 18 is returned to a seated position against face 46 of the diffuser 14 (or open position) by the force of the spring 20, which normally biases the valve 10 open.

When the valve 10 is in the closed position, the backpressure of the fluid holds the disc 18 against the valve seat 32. When the backpressure is relieved, the disc 18 moves back and seats against the diffuser 14, thus returning to its fully open position, shown in FIG. 4.

The valve body 12 may be welded or flanged or otherwise connected to the adjacent piping 24. When the valve 10 is closed, it serves as a pressure boundary between the upstream and downstream sides of the piping 24. The diffuser 14 acts as a guide for the disc 18 and also minimizes the pressure drop across the valve 10 due to it hydrodynamic geometry. The spring 20 applies continuous compressive force that keeps the disc 18 seated against the diffuser 14 and the valve 10 open unless the reverse flow induced force is greater than the spring force.

The shape of the diffuser 14 provides very low resistance to flow (pressure drop) in the normal, forward flow direction. The check valve 10 is designed so that minimal flow is allowed in the reverse flow direction, prior to valve closure. The reason for this is, in the case of a pipe break or other failure downstream of the valve, it is desirable to prevent radioactive fluid from traveling out of the nuclear reactor. In the case where a pump is positioned upstream of the valve 10, it is desired to avoid reverse flow so that the pump is not damaged.

The example valve 10 is passive and requires no flow to stay fully open. This is desirable in nuclear power plants, where valves 10 are used primarily in accident conditions to allow water to flow from the emergency tank into the containment unit. In this type of application, during normal plant operation, liquid is not flowing through the valve 10, yet the valve 10 remains open. No change in internal valve parts position relative to each other occurs when plant conditions change from normal to emergency and fluid is flowing through valve 10.

The example valve design is concentric and symmetrical with a compact design. The valve diameter D1 is only about 70% larger than the connecting pipe diameter D2. The valve 10 has a high flow coefficient (Cv) compared to traditional normally open nozzle check valves.

Figure 6:
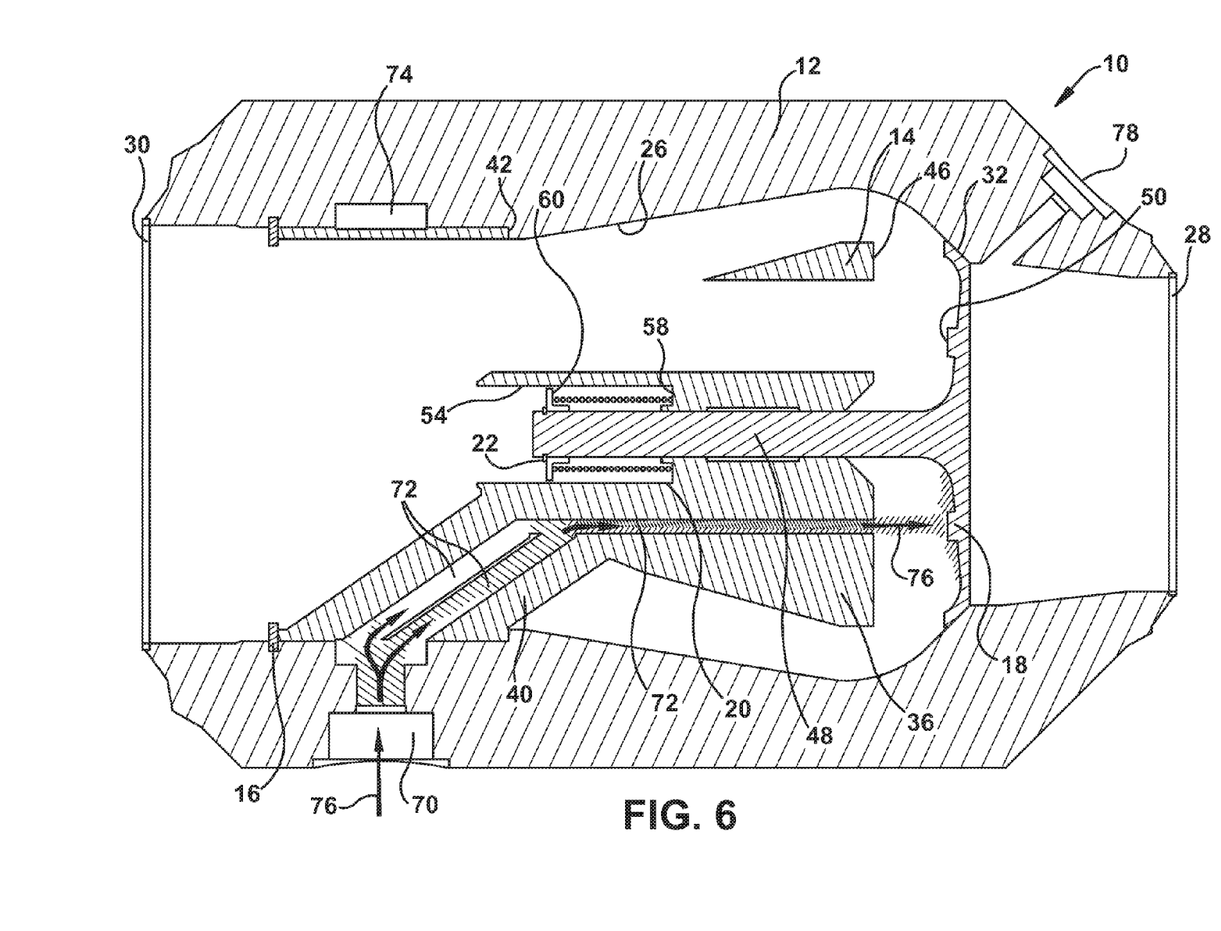
FIG. 6 depicts the flow through the testing port of the example check valve.

The example check valve 10 also includes valve closure verification, shown best in FIG. 6. It is often desirable to be able to test check valves to confirm that they are operational. The example valve 10 allows for testing without requiring full flow operation. In a preferred example, the valve 10 allows for verification with fluid flow that is less than about 20% of pipe stream closure velocity. In other examples, the fluid flow may be less than 40% or less than 60%, as long as the fluid flow is less than the normal operational fluid flow. Thus, the example check valve 10 allows for verification of valve closure with simulated fluid flow in the valve pipe line, that is less than the normal reverse flow.

Valve 10 closure verification is provided via a test port 70 that is defined on an external surface of the valve body 12 and extends into and through the diffuser 14 via one or more internal channels 72 that extend to the face 46 of the diffuser 14. The port 70 and channels 72 allow the valve 10 to be tested for proper operation using low flows, such as the flow levels mentioned above. The inlet port 70 may be positioned anywhere around the vale, but an example position is shown in FIGS. 4-6 at the bottom of the valve 10, as shown in FIG. 5. An internal cylindrical channel 74 extends around the inner surface 26 of the valve body 12 and communicates with channels 72 defined in the three ribs 40 of the diffuser 14, although only one channel 72 is shown, any number of channels 72 may be provided. For example, if four diffuser ribs 40 were utilized, then four test channels 72 could be provided. In the example shown, three ribs 40 are provided in the diffuser 14 so that three test channels 72 are utilized. The port is shown as being at the bottom of the valve 10, but could be positioned at any location on the valve 10.

In operation, fluid 76 is forced in through the port 70 and enters the cylindrical channel 74 in body 12 where it is divided into three flow paths that continue through the diffuser channels 72 in the diffuser 14 to the face 46 of the diffuser 14, where the flow exits the flow paths. At this stage, accelerated fluid impacts the downstream 50 disc surface 50 and pushes the disc 18 to a closed position, shown in FIG. 5, against the valve seat 32. The ability of the valve 10 to close under low flows relative to pipe flow, along with its hydrodynamic design, is a very desirable feature. The three ribs are 120 degrees apart and the cylindrical groove 74 that extends around the diffuser 14 links the three passageways 72.

The valve 10 closure verification mechanism allows an operator to test the operation of the check valve 10 to confirm that it will close during an accident condition. This testing may occur with less flow than is normally required during an accident condition. In addition, testing can occur when there is no reverse flow and much less fluid is utilized to test the operation of the valve 10 than is normally required to close the valve 10. This makes testing easier and more manageable. FIG. 6 shows a flow stream for the testing fluid as it impacts the downstream side 50 of the disc 18.

The velocity and flow associated with the flow through the test channels 72 is about 2 to 10 times smaller than normal reverse flow velocity. For this reason, substantially less flow is needed in order to test the valve 10.

As an alternative to the valve closure verification mechanism discussed above, the operator may use port 78, shown in FIG. 5, for verifying the valve position. A test stick (not shown), similar to a dipstick, may be utilized that has pre-established markings on the test stick. When the operator inserts the test stick into the port 78 and the test stick hits the face of disc 18, the position of the face of the disc 18 can be determined. The test stick may also be used to press against the face of the disc 18 in order to confirm that once the disc 18 leaves the valve seat 32, it can resume its original position against the valve seat 32 once pressure applied by the test stick is released.

The valve and its components are typically made of a non-corrosive material, such as stainless steel. The spring may also be made of stainless steel. The body, the diffuser, and the disc and stem assembly each are typically formed as a single integral piece, with the raw material being a casting, bar stock or forging, machined to the final dimensions. They may alternatively be formed separately. Other materials may also be used, as known by those of skill in the art. Any known manufacturing method may be utilized for forming the various part of the valve.

The valve may be coupled to the piping using any known means. There are industry standards for connection valves to pipes (with a common standard being ANSI B16.5). These standards define flange type connections or weld type connections. For a given pipe size, there may be several different flanges based on the pressure class of the pipe and valve, with piping being thicker and the flange being larger for higher pressure operations. Each valve may be designed based upon customer specification, so the connection method for connecting the valve to the piping is not critical to the invention. Examples of connections are butt welding and bolted flanges. The valve body will typically have a diameter that is greater than a diameter of the piping.

FIGS. 7-10 illustrate another example check valve apparatus 701 that includes aspects that may optionally be included in any of the previously discussed embodiments. For example, features of the check valve apparatus 701 and/or methods related thereto may be identical to corresponding features and/or methods of the check valve apparatus discussed with respect to FIGS. 1-6. Moreover, any of the aspects and/or methods of the check valve apparatus 701 may be optionally incorporated into the check valve apparatus and/or methods of FIGS. 1-6.

The check valve apparatus 701 can include a valve body 702 defining a flow path 703. A valve member 705 can be positioned within the flow path 703 of the valve body 702. A movable disc 707 can be coupled to the valve member 705 and movable with respect to the valve member within the flow path between an open position (e.g., see FIGS. 7-10) where the flow path is open to fluid flowing through the flow path and a closed position (e.g., see the disc and flow path of FIGS. 5 and 6) wherein the flow path is closed.

Figure 8:
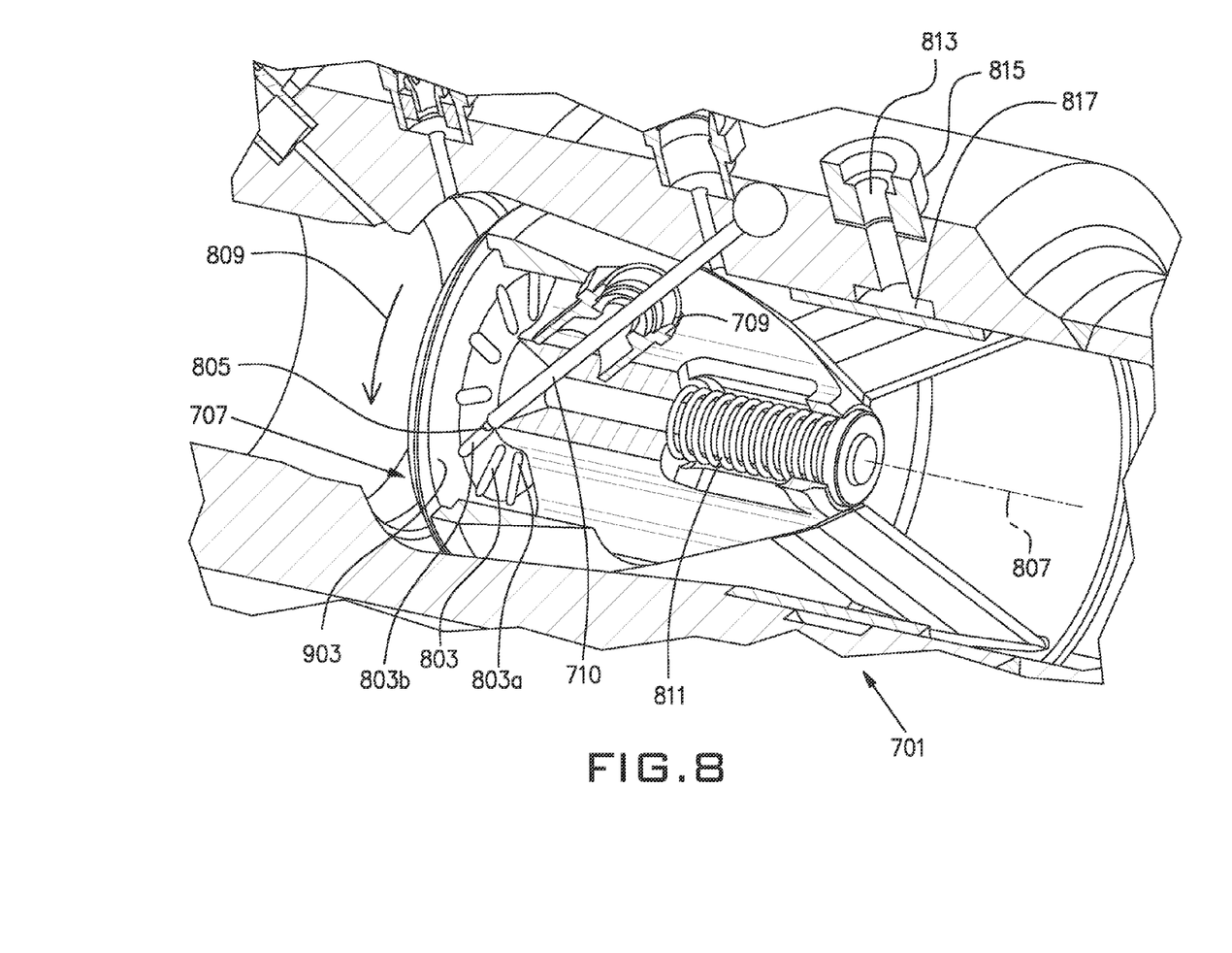
FIG. 8 is an enlarged view of cut-away portions of the check valve apparatus illustrated in FIG. 7.
Figure 9:
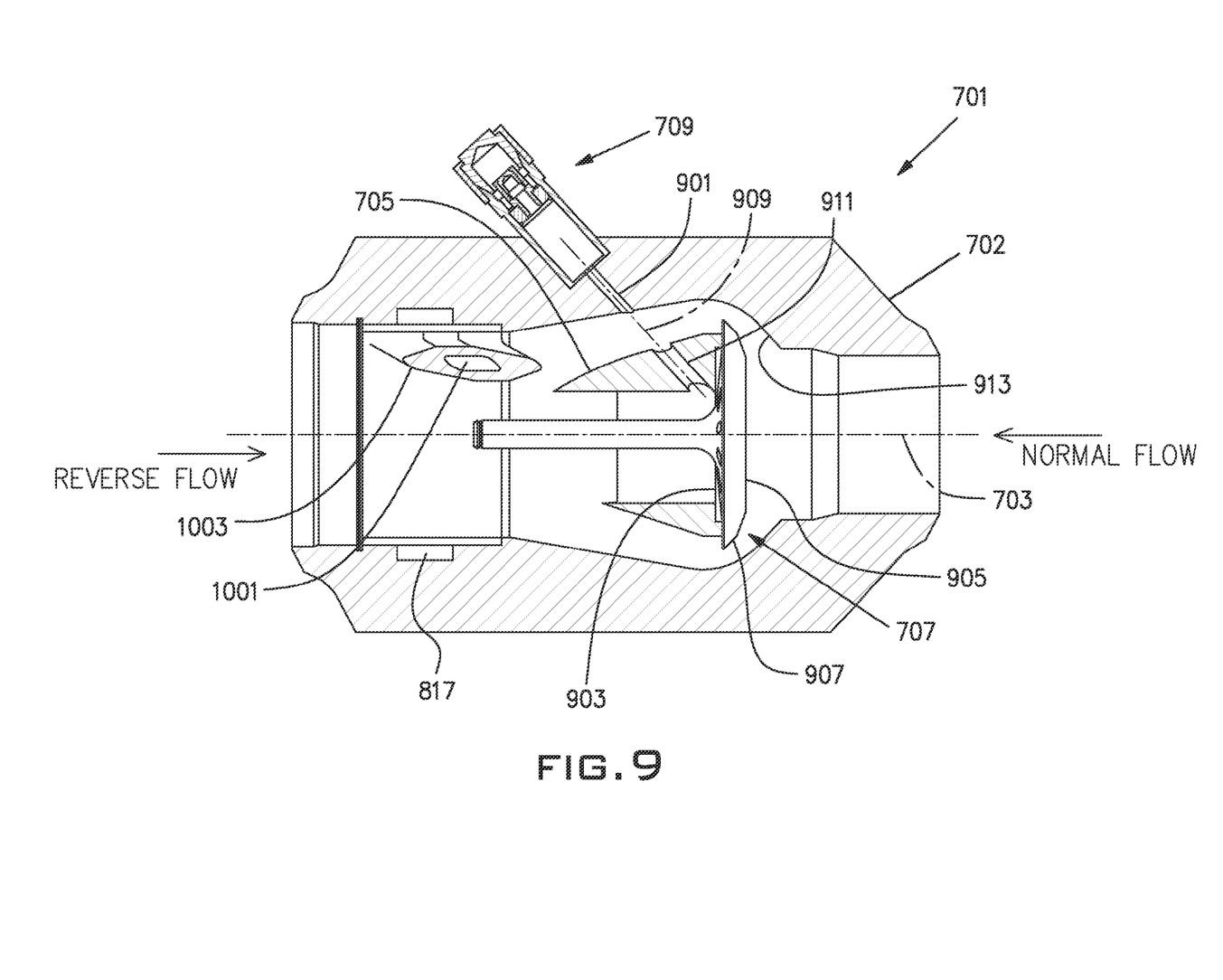
FIG. 9 is a cross-sectional view of the check valve apparatus of FIG. 7.

The check valve apparatus 701 can include at least one first test channel 709. As shown in FIG. 9, the first test channel 709 includes a first pathway 901 extending through the valve body 702 and in communication with the flow path 703, wherein the pathway is configured to receive a test stick 710 (See FIGS. 7 and 8) for inserting through the pathway 901 of the test channel to engage the disc 707 such that the disc moves from the open position to the closed position.

As shown in FIG. 9, the movable disc 707 includes a downstream face 903 and an upstream face 905 provided with an upstream valve seat 907. The check valve apparatus is configured such that a test stick 710 (FIG. 8), may be inserted through the pathway to engage the downstream face 903 of the disc such that the disc moves from the open position to the closed position. As shown in FIG. 8, the downstream face 903 can define at least one rotation element, such as the plurality of rotation elements 803, wherein the rotation element may be engaged by the test stick 710 to rotate the disc 707 while moving the disc from the open position to the closed position. As shown in FIG. 8, the rotation elements 803 may comprise the illustrated groove although other elements may be provided such as ribs, slots or other elements configured to be engaged by an end 805 of the test stick 710. The rotation elements (e.g., the groove) may be substantially straight although curved rotation elements may be provided in further examples. For instance each of the grooves 803 may comprise a substantially straight groove as shown although the groove may extend along an arc or other function to define rotation characteristics of the disc. If provided as a plurality of rotation elements, the rotation elements may be space radially about a central axis of the movable disc. For instance, as shown, the plurality of rotation elements comprise 16 grooves that are equally radially spaced about a central axis 807 of the movable disc 707.

The rotation element can be configured to interact with the test stick to rotate the disc along rotation direction 809 while linearly translating the test stick through the first pathway 901 along the linear axis 909 (See FIG. 9). Indeed, the pathway 901 is configured to receive a substantially rigid test stick 710 while permitting linear translation of the test stick through the pathway to rotate the disc while moving the disc from the open position to the closed position. As shown in FIG. 8, to achieve this end, the groove 803 can define a travel path for an end 805 of the test stick 710 engaging the groove. As shown, the end 805 may be received in a radially inward end 803a of the groove wherein linear insertion of the test stick 710 will cause the end to rotate the disc as end 805 travels within the groove 803 to a radially outward end 803b. As there are 16 grooves, one single translation of the disc 707 to the closed position results in a ¹⁄₁₆th rotation of the disc with respect to a full 360° rotation. As such, to achieve a full rotation, the disc 707 may be translated from the closed position to the open position 16 times with the end 805 of the test stick 710 incrementally engaging the next corresponding groove of the plurality of grooves.

A further shown in FIG. 9, the first test channel 709 can include a second pathway 911 extending through the valve member 705, wherein the second pathway extends along the linear axis 909 such that the first pathway 901 is axially aligned with the second pathway 911 to simultaneously receive a linear segment of a substantially rigid test stick.

As set forth above, the valve apparatus is configured to receive the test stick for inserting through the pathway of the test channel to engage the disc such that the disc rotates while moving from the open position to the closed position.

Figure 7:
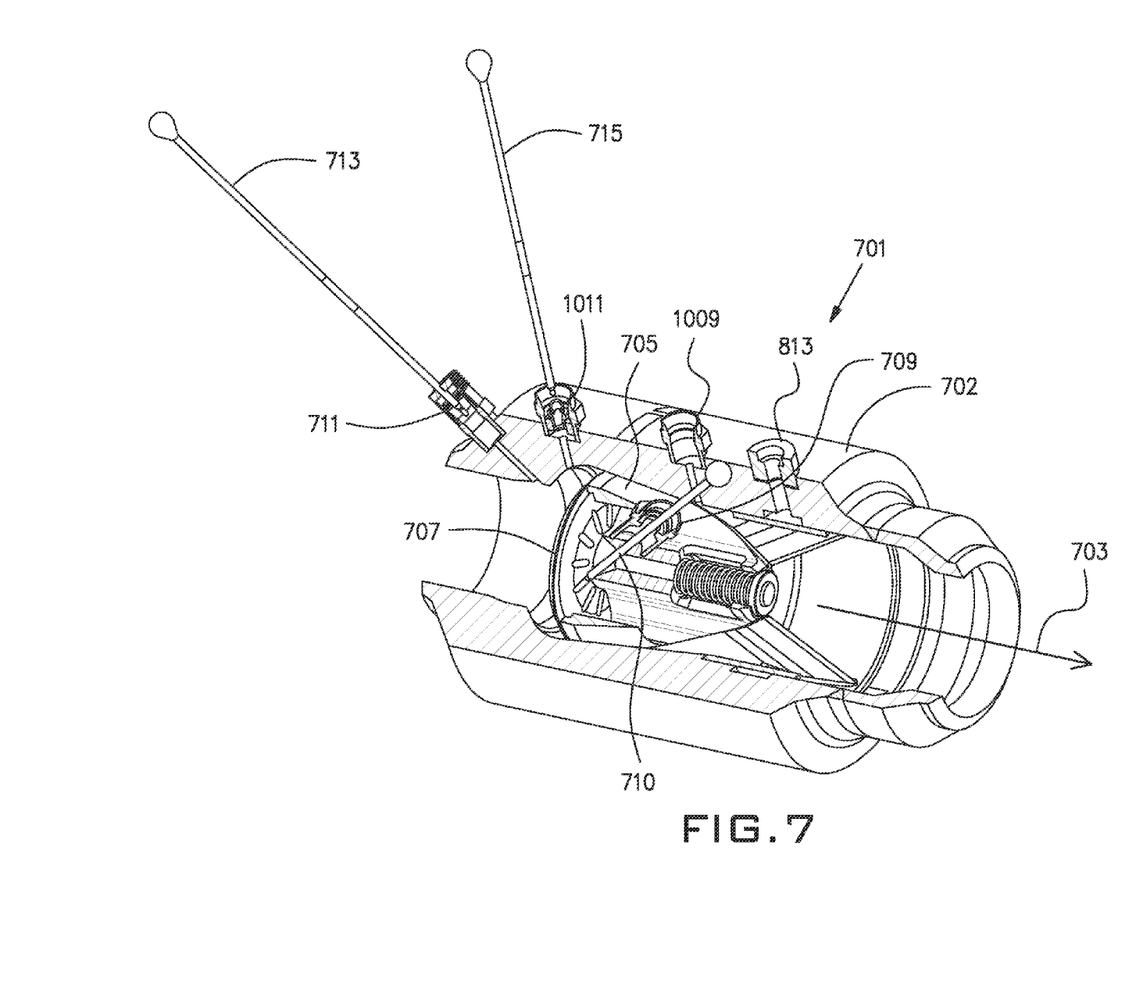
FIG. 7 is a cut-away view of another check valve apparatus.

As further shown in FIG. 7, the check valve apparatus 701 can further include another test channel 711 configured such that a test stick 713 may be inserted through the pathway of the second test channel to engage the upstream face of the disc to determine a location of the disc.

As with the embodiments of FIGS. 1-6, as shown in FIG. 8, a compression spring 811 is configured to bias the movable disc 707 into the open position and wherein the movable disc is configured to move to the closed position against the bias of the compression spring in response to a reverse flow through the flow path. Furthermore, as with the embodiments of FIGS. 1-6, the apparatus can further include another test channel 813 in fluid communication with an external port 815 outside of the flow path, wherein the movable disc is configured to move to the closed position against the bias of the compression spring in response to a fluid flowing through the second test channel from the external port. For example, as discussed previously, the valve body can include a cylindrical feed channel 817 in fluid communication with the external port 815 and the second test channel.

Furthermore, as with the embodiments of FIGS. 1-6, the check valve apparatus 701 the channel 813 comprises a plurality of second test passages 1001 (see FIG. 10), with each second test channel passage being defined in a corresponding one of a plurality of coupling ribs 1003 of the valve member 705. The valve member 705 comprises a diffuser with a conical flow diverter, wherein the conical flow diverter includes an upstream face 1005 and the compression spring 811 biases a downstream face 903 of the movable disc 707 against the upstream face 1005 of the conical flow diverter in the open position.

Still further, as with the embodiments of FIGS. 1-6, the diffuser includes at least one axial bore 1007 configured to receive a reverse flow through the flow path to act against the downstream face of the movable disc to bias the disc toward the closed position against the bias of the compression spring.

Methods of using the test check valve apparatus 701 will now be described. As set forth previously, the check valve apparatus 701 can include the movable disc 707 positioned within the flow path 703, wherein the movable disc 707 is biased into the open position with a biasing device (e.g., compression spring 811), and wherein the disc is configured to be moved to a closed position against the bias of the biasing device to close the flow path of the check valve apparatus, the check valve apparatus including the at least one first test channel 709. The method comprises the step of moving the end 805 of the test stick 710 to engage the downstream face 903 of the disc 707 such that the disc is moved against the bias of the biasing device 811 from the open position to the closed position. The method further includes the step of inspecting an interior portion of the check valve apparatus 701, for example, while the disc is in the open position after retracting the test stick to allow the disc to again be biased to the open position.

In some examples the method can further include the step of confirming the location of the disc within the flow path by engaging the upstream face 905 of the disc with an end of the test stick 713. As such, once the disc is biased into the closed position with the upstream valve seat 907 engaged with a corresponding seat 913 of the valve body 702, the test stick 713 can be inserted such that the end engages the upstream face 905 of the disc to confirm proper seating of the disc in the closed position.

Figure 10:
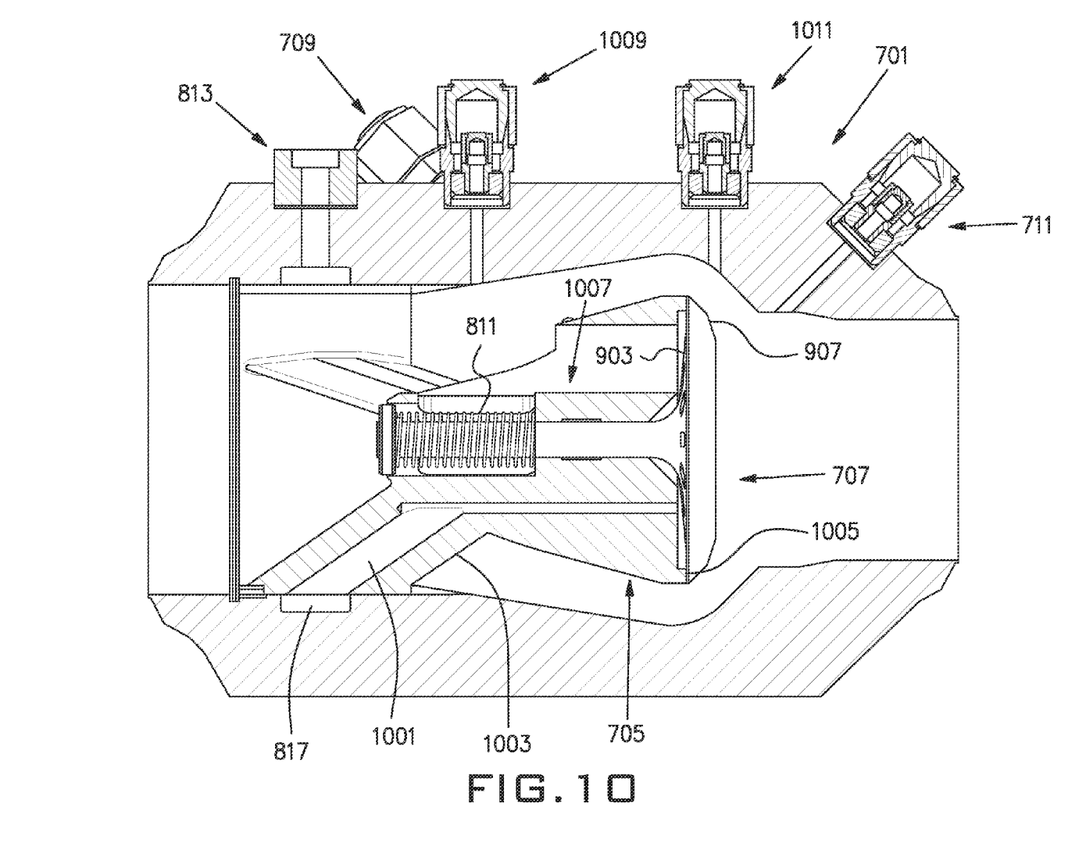
FIG. 10 is another cross-sectional view of the check valve apparatus of FIG. 7.

In further examples, the step of inspecting includes viewing the interior portion of the check valve apparatus with an optical viewing device. For example, as schematically indicated by member 715 in FIG. 7, a borescope 715 may be used to inspect interior portions of the check valve apparatus. Referring to FIG. 10, in one example, the borescope 715 or other viewing member may be inserted into port 1009 to view portions of the spring 811 such that the integrity and other aspects of the spring can be examined to ensure that the spring is in good working order. Alternatively, the borescope 715 may be inserted into port 1011 to view peripheral portions of the disc 707. As shown, the port 1011, in one example, can be arranged to allow inspection of the upstream valve seat 907 when the disc is in the open position. As such, the step of inspecting may alternatively inspect a peripheral portion of the disc, the biasing device, and/or other interior portions of the check valve apparatus.

The method can include the step of rotating the disc while the disc is moved from the open position to the closed position—e.g., by engaging the end of the test stick with the rotation element on the downstream face of the disc. Indeed, the test stick may be inserted through the first passageway 901 and the second passageway 911 in along axis 909 such that the end 805 of the test stick 710 is received within the radially inward end 803a of the groove 803. Next, the test stick is inserted further such that the end 805 slides within the groove 803 while moving the disc to the closed position, against the bias of the spring 811, such that the end slides from the radially inward end 803a to the radially outward end 803b that causes an incremental rotation of the disc along direction 809. The test stick 710 may then be retracted such that the disc 707 is biased back into the open position by the spring 811 in the new incrementally rotated position. The disc will not tend to rotate when retracting the test stick 710 since the test stick can be withdrawn faster than the spring can act on the disc such that the end 805 of the test stick 710 only engages the groove when moving the disc from the open position toward the closed position and disengages the groove when moving the disc back to the open position. In the new orientation, the borescope may be inserted within the port 1011 to observe a new outer peripheral segment of the upstream valve seat 907. As such, visual inspection of the entire periphery of the valve seat 907 may be carried out in multiple incremental steps wherein the disc is incrementally rotated to a new position and then visually inspected in the new position multiple times in sequence until the entire periphery has been observed. Such a configuration allows easy inspection of the entire valve seat 907 to confirm proper seating and sealing of the valve seat in the closed orientation. As such, the step of moving can provide a first incremental rotation of the disc by a first incremental rotation of the disc by a first rotation angle of less than 360° and then the step of inspecting can include a radial segment of the movable disc associated with the first rotation angle. The step of moving can thereafter provide another step of moving that subsequently increments by a second rotation angle of less than 360° and the step of inspecting includes a further step of inspecting another radial segment of the movable disc associated with the second rotation angle.

In further examples, inspection may occur somewhere between the open position and the closed position. For instance, the disc can be moved, as discussed previously, partway to the closed position by the test stick 710 to be partially rotated. Then the step of inspection may be carried out. As such, inspection may be carried out in smaller increments which allows to zoom in on a particular location of the peripheral area that may be located between increments of normal rotation provided by the grooves from the open position toward, such as to, the closed position. As such, in some examples, the step of moving biases the disc from the open position all the way to the closed position while in other examples, the step of moving biases of the disc from the open position to an intermediate position between the open position and the closed position, wherein the step of inspecting is conducted when the disc is in the intermediate position.

Rotation of the disc can allow alignment of the next groove for appropriate reception by the end of the test stick. For example, after rotating, the test stick can be retracted to allow the valve to be biased again into the open position with the next groove now aligned with end of the test stick. As such, the test stick may be cycled with forward and backward translations to ratchet the disc in incremental rotations wherein observation may occur, for example, between each open orientation with the disc rotated for visual inspection of multiple peripheral segments. Rotation may occur to different degrees and may be provided (as shown) to increment equally although unequal rotational angles may be provided in further examples. Moreover, although 16 rotations are shown to allow visual inspection of the outer periphery of the disc in 16 segments covering the entire outer periphery of the disc, more or less rotation elements may be provided in further examples to allow various alternative rotations to be achieved.

Some examples of the disclosure are set forth below as examples E1-E69.

E1. A check valve comprising: a valve body having a valve seat; a diffuser positioned inside the valve body; a disc coupled to and movable relative to the diffuser; and a compression spring biasing the disc into a normally open position during forward flow.

E2. The check valve of E1, wherein the compression spring biases the disc into a normally open position when there is no flow and the diffuser includes a forward face and the normally open position is when the disc is positioned against the forward face of the diffuser.

E3. The check valve of E1, wherein the disc has an upstream face and a downstream face, the valve body has a longitudinal axis, and the diffuser is axially aligned in the valve body and includes at least one through bore extending axially therethrough, said through bore being for receiving reverse flow through the valve body, with the through bore communicating with the downstream face of the disc during reverse flow.

E4. The check valve of E1, wherein the disc has an upstream face and a downstream face, the valve body has a longitudinal axis, and the diffuser is axially aligned in the valve body, with the diffuser having an outside diameter that is smaller than an outside diameter of the disc, said disc for receiving reverse flow through the valve body.

E5. The check valve of E4, wherein during reverse flow through the valve body, a force created by the reverse flow acts on the downstream face of the disc and pushes the disc against the bias of the spring against the valve seat of the valve body to close the check valve.

E6. The check valve of E1, wherein the diffuser has a forward face, the spring is positioned in a cavity defined in the diffuser, and the disc seats upon the forward face of the diffuser to close the forward face of the diffuser and force fluid, during forward flow, around the face of the diffuser.

E7. The check valve of E1, wherein the diffuser has a forward face and further comprising at least one test channel coupled between an exterior surface of the valve body and the forward face of the diffuser, said test channel having a diameter that is smaller than a diameter of the reverse flow through bore.

E8. The check valve of E7, wherein the at least one test channel includes three channels that are spaced around the face of the diffuser, with said channels being configured to receive a test fluid to test whether the disc is movable and can rest against the valve seat in response to insertion of the test fluid.

E9. The check valve of E1, wherein the valve body includes at least one test channel that extends through the valve body at a position in the vicinity of the valve seat, with the test channel including a port on the valve body that has a diameter sufficient to allow a flexible test stick to be inserted through the passageway to engage a surface of the disc.

E10. The check valve of E9, wherein the at least one test channel is utilized to test the operation of the check valve with a total reverse flow that is less than 20% of the normal reverse flow required to close the valve.

E11. The check valve of E1, further comprising a diffuser retaining ring positioned inside the valve body for retaining the diffuser in the valve body; and a spring holder retaining ring for retaining the spring holder and the spring in the diffuser.

E12. A check valve apparatus for confirming closure of the valve under low flow situations, the check valve apparatus comprising: a valve body; a valve member positioned in the valve body; a movable disc coupled to the valve member and movable relative thereto; and at least one test channel having an external inlet, the channel extending through the valve member and being in communication with the disc.

E13. The check valve apparatus of E12, wherein when sufficient fluid flows through the test channel, the disc moves until it abuts the valve body.

E14. The check valve apparatus of E12, wherein the at least one test channel includes a continuous pathway for accepting a test stick for inserting through the test channel to meet the disc, with the at least one test channel having at least one external port.

E15. The check valve apparatus of E12, wherein the valve body includes an external port and a cylindrical feed channel that is coupled to the external port, with the feed channel being coupled to the at least one test channel and the at least one test channel comprising three test channels, with the test channels being defined in ribs that couple part a first part of the valve member to a second part of the valve member.

E16. The check valve of E12, wherein the valve member is a diffuser having a forward end in the form of a conical flow diverter and a rear end in the form of a cylindrical bearing ring, with the conical flow diverter being coupled to the cylindrical bearing ring via a plurality of ribs, with the at least one test channel extending from the external inlet, through the cylindrical bearing ring, through at least one of the ribs, and through the conical flow diverter to the disc.

E17. A method for testing the operation of a passive check valve, with the check valve having a test channel that extends between an inlet and an outlet, with the inlet being positioned on an outer surface of the check valve and the outlet being positioned inside the check valve, with the check valve including a movable disc that is positioned adjacent the exit of the test channel, the method comprising: inserting a fluid or a testing stick into the test channel such that the respective fluid or testing stick impacts a surface of the disc; and confirming the location of the disc.

E18. The method of E17, wherein the fluid is inserted into the test bore at a velocity that is sufficient to move the disc into a closed position and the confirming step includes determining whether flow is permitted through the check valve.

E19. The method of E17, wherein the testing strip is inserted into the test bore and impacts the disc to test the location of the disc.

E20. A check valve apparatus comprising: a valve body defining a flow path; a valve member positioned within the flow path of the valve body; a movable disc coupled to the valve member and movable with respect to the valve member within the flow path; and at least one first test channel including a single continuous pathway extending through the valve body and in communication with the flow path by a single internal inlet, wherein the pathway is configured to receive a test stick for inserting through the pathway of the test channel to engage the disc.

E21. The check valve apparatus of E20, further comprising a compression spring configured to bias the movable disc into an open position and wherein the movable disc is configured to move to a closed position against the bias of the compression spring in response to a reverse flow through the flow path.

E22. The check valve apparatus of E21, further comprising at least one second test channel in fluid communication with an external port outside of the flow path, wherein the movable disc is configured to move to the closed position against the bias of the compression spring in response to a fluid flowing through the second test channel from the external port.

E23. The check valve apparatus of E22, wherein the valve body includes a cylindrical feed channel in fluid communication with the external port and the second test channel.

E24. The check valve apparatus of E22, wherein the at least one second test channel comprises a plurality of second test channels, with each second test channel being defined in a corresponding one of a plurality of coupling ribs.

E25. The check valve apparatus of E21, wherein the valve member comprises a diffuser with a conical flow diverter.

E26. The check valve apparatus of E25, wherein the conical flow diverter includes an upstream face and the compression spring biases a downstream face of the movable disc against the upstream face of the conical flow diverter in the open position.

E27. The check valve apparatus of E26, wherein the diffuser includes at least one axial bore configured to receive a reverse flow through the flow path to act against the downstream face of the movable disc to bias the disc toward the closed position against the bias of the compression spring.

E28. A check valve apparatus comprising: a valve body defining a flow path; a valve member positioned within the flow path of the valve body; a movable disc coupled to the valve member and movable with respect to the valve member within the flow path; a compression spring configured to bias the movable disc into an open position and wherein the movable disc is configured to move to a closed position against the bias of the compression spring in response to a reverse flow through the flow path; and at least one first test channel in fluid communication with an external port outside of the flow path, wherein the movable disc is configured to move to the closed position against the bias of the compression spring in response to a fluid flowing through the test channel from the external port.

E29. The check valve apparatus of E28, further comprising at least one second test channel including a pathway with an external inlet and an internal inlet in communication with the flow path, the pathway extending through the valve member, wherein the pathway is configured to receive a test stick for inserting through the pathway of the test channel to engage the disc.

E30. The check valve apparatus of E29, wherein the pathway of the second test channel comprises a single continuous pathway and the internal inlet comprises a single internal inlet.

E31. The check valve apparatus of E28, wherein the valve body includes a cylindrical feed channel in fluid communication with the external port and the first test channel.

E32. The check valve apparatus of E28, wherein the at least one first test channel comprises a plurality of first test channels, with each first test channel being defined in a corresponding one of a plurality of coupling ribs.

E33. The check valve apparatus of E28, wherein the valve member comprises a diffuser with a conical flow diverter.

E34. The check valve apparatus of E33, wherein the conical flow diverter includes upstream face and the compression spring biases a downstream face of the movable disc against the upstream face of the conical flow diverter in the open position.

E35. The check valve apparatus of E34, wherein the diffuser includes at least one axial bore configured to receive a reverse flow through the flow path to act against the downstream face of the movable disc to bias the disc toward the closed position against the bias of the compression spring.

E36. A method for testing a check valve apparatus including a movable disc positioned within a flow path of the check valve apparatus, wherein the movable disc is biased into the open position with a biasing device, and wherein the disc is configured to be moved to a closed position against the bias of the biasing device to close the flow path of the check valve apparatus, the check valve apparatus including at least one first test channel extending between an inlet and an outlet of the first test channel, with the inlet being positioned on an outer portion of the check valve apparatus and the outlet being positioned inside the check valve apparatus in communication with the flow path, the method comprising: inserting an end of a test stick into the inlet of the first test channel, through a pathway of the first test channel, and out the outlet of the first test channel in a direction transverse to a direction of the flow path to engage a surface of the disc within the flow path; and confirming the location of the disc within the flow path by engaging the surface of the disc with the end of the test stick.

E37. The method of E36, wherein the check valve apparatus further includes at least one second test channel in fluid communication with an external port outside of the flow path, wherein the method further includes the step of flowing fluid through the second test channel from the external port to move the movable disc to the closed position.

E38. A method of testing a check valve apparatus comprising a valve body defining a flow path, a valve member positioned within the flow path, a movable disc coupled to the valve member and movable relative to the valve member within the flow path, a compression spring biasing the movable disc into an open position and wherein the movable disc is configured to move to a closed position against the bias of the compression spring in response to a reverse flow through the flow path, and at least one first test channel in fluid communication with an external port outside of the flow path, wherein the method comprises: flowing fluid through the test channel from the external port to move the movable disc to the closed position against the bias of the compression spring.

E39. The method of E38, wherein the check valve apparatus further includes at least one second test channel extending between an inlet and an outlet of the second test channel, with the inlet being positioned on an outer portion of the check valve apparatus and the outlet being positioned inside the check valve apparatus in communication with the flow path, the method comprising: inserting an end of a test stick into the inlet of the second test channel, through a pathway of the second test channel, and out the outlet of the second test channel in a direction transverse to a direction of the flow path to engage a surface of the disc within the flow path; and confirming the location of the disc within the flow path by engaging the surface of the disc with the end of the test stick.

E40. A check valve apparatus comprising: a valve body defining a flow path; a valve member positioned within the flow path of the valve body; a movable disc coupled to the valve member and movable with respect to the valve member within the flow path between an open position wherein the flow path is open and a closed position wherein the flow path is closed; and at least one first test channel including a first pathway extending through the valve body and in communication with the flow path, wherein the pathway is configured to receive a test stick for inserting through the pathway of the test channel to engage the disc such that the disc moves from the open position to the closed position.

E41. The check valve apparatus of E40, wherein the movable disc includes a downstream face and an upstream face provided with an upstream valve seat, wherein the check valve apparatus is configured such that the test stick may be inserted through the pathway to engage the downstream face of the disc such that the disc moves from the open position to the closed position.

E42. The check valve apparatus of E41, wherein the movable disc includes at least one rotation element defined by the downstream face of the movable disc, wherein the rotation element is configured to be engaged by the test stick to rotate the disc while moving the disc from the open position to the closed position.

E43. The check valve apparatus of E42, wherein the rotation element comprises a groove.

E44. The check valve apparatus of E43, wherein the groove is substantially straight.

E45. The check valve apparatus of E42, wherein the at least one rotation element comprises a plurality of rotation elements radially spaced about a central axis of the movable disc.

E46. The check valve apparatus of E42, wherein the rotation element is configured to interact with the test stick to rotate the disc while linearly translating the test stick through the first pathway along a linear axis.

E47. The check valve apparatus of E40, wherein the first test channel includes a second pathway extending through the valve member, wherein the second pathway extends along the linear axis such that the first pathway is axially aligned with the second pathway to simultaneously receive a linear segment of a substantially rigid test stick.

E48. The check valve apparatus of E40, wherein the valve apparatus is configured to receive the test stick for inserting through the pathway of the test channel to engage the disc such that the disc rotates while moving from the open position to the closed position.

E49. The check valve apparatus of E48, wherein the pathway is configured to receive a substantially rigid test stick while permitting linear translation of the test stick through the pathway to rotate the disc while moving the disc from the open position to the closed position.

E50. The check valve apparatus of E40, wherein the movable disc includes a downstream face and an upstream face provided with an upstream valve seat, and the check valve apparatus further includes at least one second test channel and configured such that a test stick may be inserted through the pathway of the second test channel to engage the upstream face of the disc to determine a location of the disc.

E51. The check valve apparatus of E40, further comprising a compression spring configured to bias the movable disc into the open position and wherein the movable disc is configured to move to the closed position against the bias of the compression spring in response to a reverse flow through the flow path.

E52. The check valve apparatus of E51, further comprising at least one second test channel in fluid communication with an external port outside of the flow path, wherein the movable disc is configured to move to the closed position against the bias of the compression spring in response to a fluid flowing through the second test channel from the external port.

E53. The check valve apparatus of E52, wherein the valve body includes a cylindrical feed channel in fluid communication with the external port and the second test channel.

E54. The check valve apparatus of E52, wherein the at least one second test channel comprises a plurality of second test passages, with each second test channel passage being defined in a corresponding one of a plurality of coupling ribs.

E55. The check valve apparatus of E51, wherein the valve member comprises a diffuser with a conical flow diverter.

E56. The check valve apparatus of E55, wherein the conical flow diverter includes an upstream face and the compression spring biases a downstream face of the movable disc against the upstream face of the conical flow diverter in the open position.

E57. The check valve apparatus of E56, wherein the diffuser includes at least one axial bore configured to receive a reverse flow through the flow path to act against the downstream face of the movable disc to bias the disc toward the closed position against the bias of the compression spring.

E58. A method for testing a check valve apparatus including a movable disc positioned within a flow path of the check valve apparatus, wherein the movable disc is biased into the open position with a biasing device, and wherein the disc is configured to be moved to a closed position against the bias of the biasing device to close the flow path of the check valve apparatus, the check valve apparatus including at least one first test channel, the method comprising: moving an end of a test stick to engage a downstream face of the disc such that the disc is moved against the bias of the biasing device from the open position toward the closed position; and then inspecting an interior portion of the check valve apparatus.

E59. The method of E58, wherein the step of moving rotates the disc while the disc is moved from the open position toward the closed position.

E60. The method of E59, wherein the end of the test stick engages a rotation element of the downstream face of the disc to rotate the disc.

E61. The method of E58, wherein the step of moving provides a first incremental rotation of the disc by a first rotation angle of less than 360°.

E62. The method of E61, wherein the step of inspecting inspects a radial segment of the movable disc associated with the first rotation angle.

E63. The method of E62, wherein the step of moving includes another step of moving that provides a second incremental rotation of the disc by a second rotation angle of less than 360° and the step of inspecting includes a further step of inspecting another radial segment of the movable disc associated with the second rotation angle.

E64. The method of E58, further including the step of confirming the location of the disc within the flow path by engaging an upstream face of the disc with an end of the test stick.

E65. The method of E58, wherein the step of inspecting includes viewing the interior portion of the check valve apparatus with an optical viewing device.

E66. The method of E58, wherein the step of inspecting includes inspecting a peripheral portion of the disc.

E67. The method of E58, wherein the step of inspecting includes inspecting the biasing device.

E68. The method of claim E58, wherein the step of moving biases the disc from the open position to the closed position.

E69. The method of claim E58, wherein the step of moving biases of the disc from the open position to an intermediate position between the open position and the closed position, wherein the step of inspecting is conducted when the disc is in the intermediate position.

The term "substantially," if used herein, is a term of estimation.

While various features are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. A check valve apparatus comprising:
    a valve body defining a flow path;
    a valve member positioned within the flow path of the valve body;
    a movable disc coupled to the valve member and movable with respect to the valve member within the flow path between an open position wherein the flow path is open and a closed position wherein the flow path is closed; and
    at least one first test channel including a first pathway extending through the valve body and in communication with the flow path, wherein the first pathway is configured to receive a test stick for inserting through the first pathway of the test channel to engage the movable disc such that the movable disc moves from the open position toward the closed position,
    wherein the movable disc includes a downstream face and an upstream face provided with an upstream valve seat, wherein the check valve apparatus is configured such that the test stick may be inserted through the first pathway to engage the downstream face of the movable disc such that the movable disc moves from the open position toward the closed position.

2. The check valve apparatus of claim 1, wherein the movable disc includes at least one rotation element defined by the downstream face of the movable disc, wherein the rotation element is configured to be engaged by the test stick to rotate the movable disc while moving the movable disc from the open position toward the closed position.

3. The check valve apparatus of claim 2, wherein the rotation element comprises a groove.

4. The check valve apparatus of claim 3, wherein the groove is substantially straight.

5. The check valve apparatus of claim 2, wherein the at least one rotation element comprises a plurality of rotation elements radially spaced about a central axis of the movable disc.

6. The check valve apparatus of claim 2, wherein the rotation element is configured to interact with the test stick to rotate the movable disc while linearly translating the test stick through the first pathway along a linear axis.

7. The check valve apparatus of claim 1, wherein the first test channel includes a second pathway extending through the valve member, wherein the second pathway extends along the linear axis such that the first pathway is axially aligned with the second pathway to simultaneously receive a linear segment of a substantially rigid test stick.

8. The check valve apparatus of claim 1, wherein the movable disc includes a downstream face and an upstream face provided with an upstream valve seat, and the check valve apparatus further includes at least one second test channel and configured such that a test stick may be inserted through the first pathway of the second test channel to engage the upstream face of the movable disc to determine a location of the movable disc.

9. The check valve apparatus of claim 1, further comprising a compression spring configured to bias the movable disc into the open position and wherein the movable disc is configured to move to the closed position against the bias of the compression spring in response to a reverse flow through the flow path.

10. The check valve apparatus of claim 9, further comprising at least one second test channel in fluid communication with an external port outside of the flow path, wherein the movable disc is configured to move to the closed position against the bias of the compression spring in response to a fluid flowing through the second test channel from the external port.

11. The check valve apparatus of claim 10, wherein the valve body includes a cylindrical feed channel in fluid communication with the external port and the second test channel.

12. The check valve apparatus of claim 10, wherein the at least one second test channel comprises a plurality of second test passages, with each second test channel passage being defined in a corresponding one of a plurality of coupling ribs.

13. The check valve apparatus of claim 9, wherein the valve member comprises a diffuser with a conical flow diverter.

14. The check valve apparatus of claim 13, wherein the conical flow diverter includes an upstream face and the compression spring biases a downstream face of the movable disc against the upstream face of the conical flow diverter in the open position.

15. The check valve apparatus of claim 14, wherein the diffuser includes at least one axial bore configured to receive a reverse flow through the flow path to act against the downstream face of the movable disc to bias the movable disc toward the closed position against the bias of the compression spring.

16. A check valve apparatus comprising:
a valve body defining a flow path;
a valve member positioned within the flow path of the valve body;
a movable disc coupled to the valve member and movable with respect to the valve member within the flow path between an open position wherein the flow path is open and a closed position wherein the flow path is closed; and
at least one first test channel including a first pathway extending through the valve body and in communication with the flow path, wherein the first pathway is configured to receive a test stick for inserting through the first pathway of the test channel to engage the movable disc such that the movable disc moves from the open position toward the closed position,
wherein the check valve apparatus is configured to receive the test stick for inserting through the first pathway of the test channel to engage the movable disc such that the movable disc rotates while moving from the open position toward the closed position wherein the movable disc includes a downstream face and an upstream face provided with an upstream valve seat, wherein the check valve apparatus is configured such that the test stick may be inserted through the first pathway to engage the downstream face of the movable disc such that the movable disc moves from the open position toward the closed position.

17. The check valve apparatus of claim 16, wherein the first pathway is configured to receive a substantially rigid test stick while permitting linear translation of the test stick through the first pathway to rotate the movable disc while moving the movable disc from the open position toward the closed position.

18. The check valve apparatus of claim 16, wherein the first test channel includes a second pathway extending through the valve member, wherein the second pathway extends along the linear axis such that the first pathway is axially aligned with the second pathway to simultaneously receive a linear segment of a substantially rigid test stick.

19. The check valve apparatus of claim 16, further includes at least one second test channel and configured such that a test stick may be inserted through the first pathway of the second test channel to engage the upstream face of the movable disc to determine a location of the movable disc.

20. The check valve apparatus of claim 16, further comprising a compression spring configured to bias the movable disc into the open position and wherein the movable disc is configured to move to the closed position against the bias of the compression spring in response to a reverse flow through the flow path.

21. A method for testing a check valve apparatus including a movable disc positioned within a flow path of the check valve apparatus, wherein the movable disc is biased into an open position with a biasing device, and wherein the movable disc is configured to be moved to a closed position against the bias of the biasing device to close the flow path of the check valve apparatus, the check valve apparatus including at least one first test channel, the method comprising:
moving an end of a test stick to engage a downstream face of the movable disc such that the movable disc is moved against the bias of the biasing device from the open position toward the closed position; and then
inspecting an interior portion of the check valve apparatus.

22. The method of claim 21, wherein the step of moving rotates the movable disc while the movable disc is moved from the open position toward the closed position.

23. The method of claim 22, wherein the end of the test stick engages a rotation element of the downstream face of the movable disc to rotate the movable disc.

24. The method of claim 21, wherein the step of moving provides a first incremental rotation of the movable disc by a first rotation angle of less than 360°.

25. The method of claim 24, wherein the step of inspecting inspects a radial segment of the movable disc associated with the first rotation angle.

26. The method of claim 25, wherein the step of moving includes another step of moving that provides a second incremental rotation of the movable disc by a second rotation angle of less than 360° and the step of inspecting includes a further step of inspecting another radial segment of the movable disc associated with the second rotation angle.

27. The method of claim 21, further including the step of confirming a location of the movable disc within the flow path by engaging an upstream face of the movable disc with an end of the test stick.

28. The method of claim 21, wherein the step of inspecting includes viewing the interior portion of the check valve apparatus with an optical viewing device.

29. The method of claim 21, wherein the step of inspecting includes inspecting a peripheral portion of the movable disc.

30. The method of claim 21, wherein the step of inspecting includes inspecting the biasing device.

31. The method of claim 21, wherein the step of moving biases the movable disc from the open position to the closed position.

32. The method of claim 21, wherein the step of moving biases of the movable disc from the open position to an intermediate position between the open position and the closed position, wherein the step of inspecting is conducted when the movable disc is in the intermediate position.

* * * * *